United States Patent Office 3,541,789
Patented Nov. 24, 1970

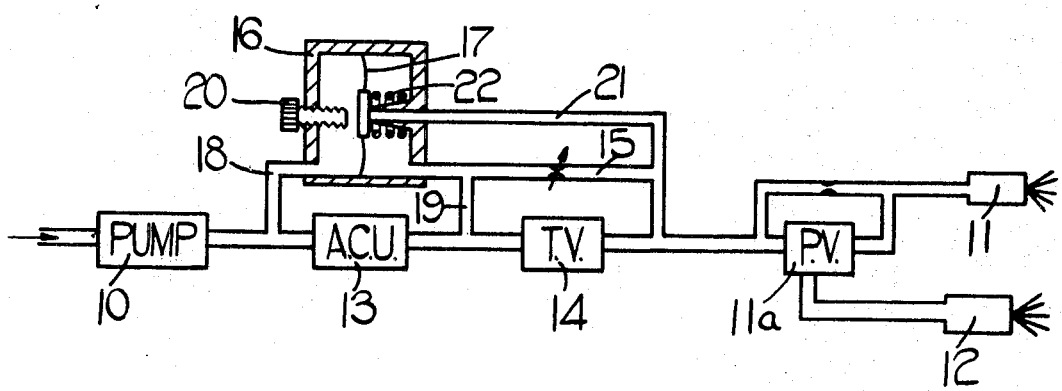

3,541,789
GAS TURBINE ENGINE DECELERATION
CONTROL APPARATUS
Denis Gascoigne, Alcester, England, assignor to Joseph
Lucas (Industries) Limited, Birmingham, England
Filed June 6, 1968, Ser. No. 734,973
Int. Cl. F02c 9/08
U.S. Cl. 60—39.28                                    2 Claims

ABSTRACT OF THE DISCLOSURE

Deceleration control apparatus for gas turbine engines comprises a fuel control unit, and a throttle valve in series, and a means for sensing the pressure drop obtaining across the fuel control unit, and passage means providing a by-pass for fuel past the throttle valve and a valve in the passage controlled by said means.

This invention relates to deceleration control apparatus for use in controlling the rate of reduction of flow of fuel to a gas turbine engine during deceleration.

In a gas turbine engine, it is as important to control the rate of deceleration as that of acceleration since if the fuel/air ratio is outside predetermined limts, condtions such as surge in the engine may be induced, it being particularly important that this does not occur in aircraft engines. For example, as when the pilot moves the manual control rapidly to reduce engine speed, the fuel flow must not be allowed to fall unduly quickly since this can result in the engine being under fuelled. It is diffcult to restart an engine, once stopped, due to such factors as low density air at high altitudes.

The object of the invention is to provide a control apparatus which can restrict the rate of reduction of flow of fuel to the engine under deceleration conditions.

In accordance with the present invention there is provided deceleration control apparatus for a gas turbine engine fuel system having pilot and main burners including a main fuel flow path to the burners, a pump for supplying fuel to the burners through the main fuel flow path, a fuel control unit and a manually controllable throttle valve in the main fuel flow path arranged in series, sensing means including a chamber, a diaphragm in the chamber, passage means communicating with the chamber, whereby the pressure drop obtaining across the fuel control unit is sensed by said diaphragm, further passage means communicating with the chamber at one side of the diaphragm and with the main fuel flow path downstream of the manually controllable throttle valve to provide a bypass for fuel past the throttle valve, a valve carried by the diaghragm to control flow through the further passage means, and spring means operably related to the valve for biasing the member towards a position permitting flow through the further passage means whereby fuel bypasses the throttle valve and reaches the pilot and main burners.

The invention will now be described by way of example with reference to the accompanying drawing, the single figure of which illustrates diagrammatically one form of apparatus constructed in accordance with the invention.

In the example illustrated, there is shown a fuel system for a gas turbine engine comprising a pump 10 which is arranged to supply fuel to pilot and main burners indicated at 11 and 12 respectively. A proportioning valve 11a determines the quantities reaching the respective sets of burners 11, 12. Between the pump 10 and the burners 11, 12 is a fuel control unit which in this example is an acceleration control unit, indicated generally at 13. In series with this unit is a manually controllable throttle valve 14. The unit 13 may be of any known kind, and is arranged to permit the flow of fuel to the engenie in accordance with various parameters related to engine operating conditions. There is also a restricted by-pass passage 15 whereby fuel for the purpose of maintaining the engine at idling speed can by-pass the throttle valve 14 when the latter is closed.

In order to control the rate of reduction of flow of fuel to the engine under deceleration conditions, there is provided means, in the form of a chamber 16 containing a diaphragm 17, for sensing the pressure drop obtaining across the acceleration control unit 13. There are passages 18, 19 affording communication between opposite sides of the unit 13 and opposite sides of the diaphragm 17 respectively.

Carried by the diaphragm 17 is a valve closure member 20 which is loaded by a spring 22 towards a position to permit flow through the passage 19 and into the chamber 16 at one side of the diaphragm 17, and out through a passage 21 to a position downstream of the throttle valve 14 in the system. An adjustable stop 23 determines the maximum opening position of the member 20.

In use, under normal steady running conditions, there is a sufficient pressure drop across the unit 13 to cause the valve closure member on the diaphragm 17 to move to close access to the passage 21, but in the event of rapid closure of the throttle valve 14 the pressure drop across the unit 13 is substantially reduced so that the spring 22 urges the diaphragm 17 so that the valve closure member 20 permits access of fuel from the passage 19 and into the passage 21. This fuel by-passes the throttle valve 14 and reaches the burners 11, 12 in the engine.

As the pressure drop across the unit 13 returns to its normal steady running value, the diaphragm 17 again moves to close access to the passage 21.

Having thus described my invention what I claim as new and desire to secure by Letters Patent is:

1. Deceleration control apparatus for a gas turbine engine fuel system having a pilot and main burners, including a main fuel flow path to the burners, a pump for supplying fuel to the burners through the main fuel flow path, a fuel control unit and a manually controllable throttle valve arranged in the main fuel flow path in series, sensing means including a chamber, a diaphragm in said chamber, passage means communicating with a main fuel flow path and chamber whereby the pressure drop obtaining across the fuel control unit is sensed by said diaphragm, a further passage means communicating with the chamber at one side of the diaphragm and the main fuel flow path downstream of the throttle valve to provide a by-pass for fuel past the throttle valve, a valve member carried by the diaphragm to control flow through said further passage means and spring means operably related to the valve member for biasing said member towards a position permitting flow through the further passage means to a position downstream of a manually controllable throttle valve whereby fuel bypasses the throttle valve and reaches the pilot and main burners.

2. Deceleration control apparatus as claimed in claim 5 in which the by-pass passage means communicates with the main fuel flow path between the fuel control unit and the throttle valve.

References Cited

UNITED STATES PATENTS

| | | |
|---|---|---|
| 2,422,808 | 6/1947 | Stokes. |
| 2,440,566 | 4/1948 | Armstrong. |
| 2,674,847 | 4/1954 | Davies. |
| 2,950,597 | 8/1960 | Clarke _____ 60—39.28 |
| 2,971,339 | 2/1961 | Gold. |
| 3,074,472 | 1/1963 | Williams _____ 60—39.28 |

MARK NEWMAN, Primary Examiner